United States Patent Office 3,032,932
Patented May 8, 1962

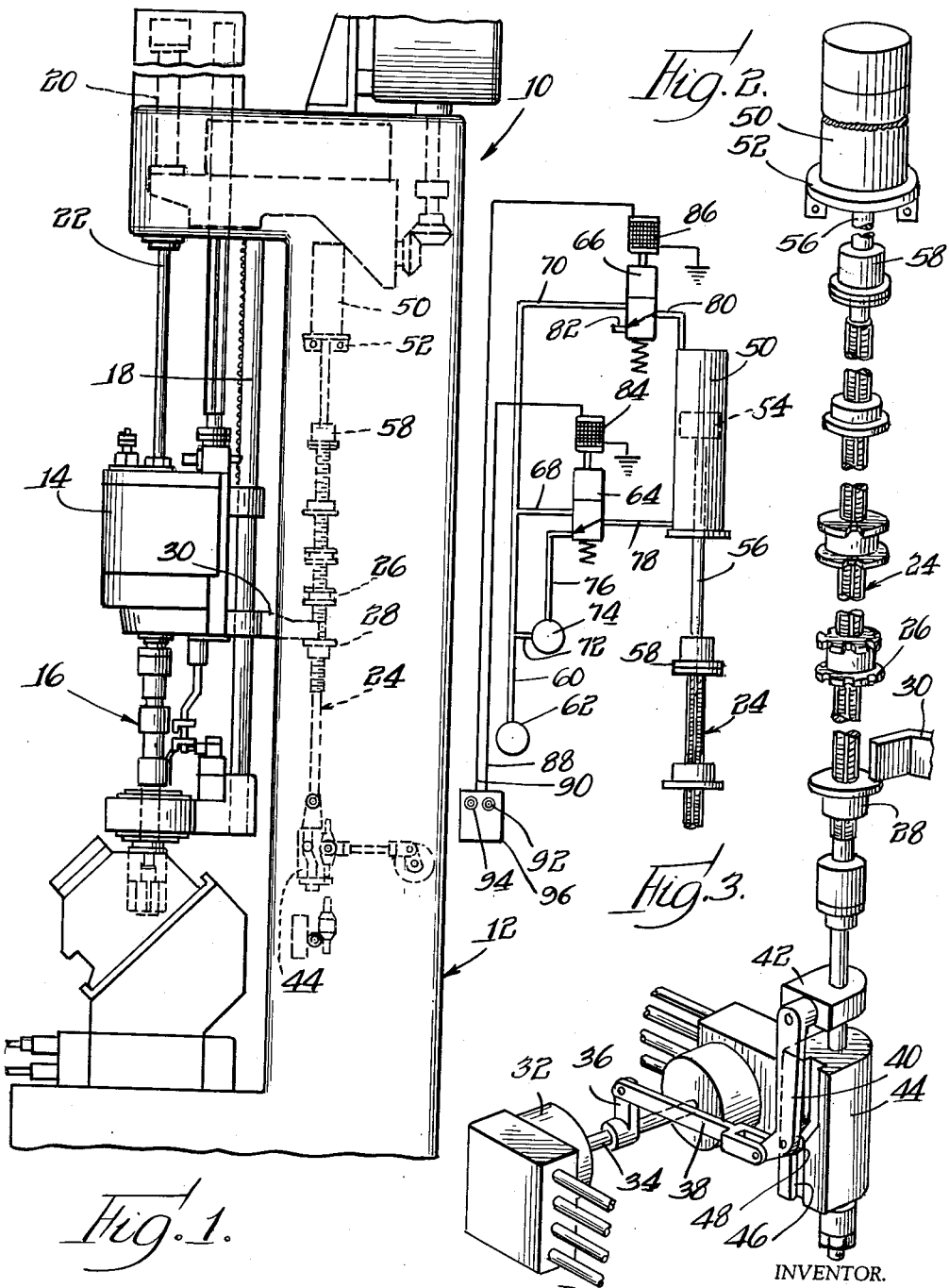

3,032,932
HONING APPARATUS CONTROL MEANS
Lavern Bargren, Rockford, Ill., assignor, by mesne assignments, to National Automatic Tool Company, Inc., Richmond, Ind., a corporation of Indiana
Filed June 6, 1958, Ser. No. 740,272
3 Claims. (Cl. 51—34)

The present invention relates to a novel apparatus for machining or honing a workpiece, and more particularly to an apparatus having novel means for controlling a machining or honing operation.

In an application Serial No. 740,445, filed June 6, 1958 by Floyd A. Swanson, there is disclosed an apparatus for honing a workpiece, which apparatus comprises a head mounted for reciprocable movement and carrying one or more honing tools or spindles. Hydraulic means is disclosed in said application for reciprocating the head, which hydraulic means is controlled by means including a reversible pilot valve and a vertically reciprocable control rod carrying dogs thereon disposed for engagement with an element projecting from the head. Thus, when the head approaches the lower end, for example, of its reciprocable movement, the element engages a lower dog so as to push the control rod downwardly and thereby shift the pilot valve in a manner in which causes reversal of the head. Similarly, the head is again reversed when it reaches the upper limit of its reciprocable movement since the element will engage an upper dog on the control rod and shift the control rod upwardly to cause the pilot valve to be returned to its original position. In the above mentioned co-pending application spring means is disclosed for balancing the weight of the control rod and elements associated therewith so that the rod will remain in any position to which it is shifted by the element projecting from the reciprocable head. Thus, the length of the reciprocable stroke of the head is determined by a distance between the dogs on the control rod.

In the apparatus disclosed in the above mentioned co-pending application the length of the stroke of the head and thus the work machining or honing tool is constant during any given machining or honing operation and can be changed only by adjusting the distance between the dogs on the control rod. It will be appreciated that during the machining or honing of a given workpiece, it is often desirable to work on one portion of a workpiece surface more than another and this is particularly true of portions of a workpiece surface adjacent opposite ends of the stroke of the machining or honing tool. It is therefore an important object of the present invention to provide an improved apparatus of the type disclosed in the above mentioned co-pending application having novel control means which may be operated to cause the machining or honing tool to reciprocate with a relatively short stroke as compared with the length of the normal stroke of the tool so that a limited portion of a workpiece surface may be machined or honed when desired.

A more specific object of the present invention is to provide a novel apparatus of the above described type which is constructed so as to permit relatively short stroke operation of the machining or honing tool adjacent either or both ends of the normal stroke of the tool.

A still further specific object of the present invention is to provide a novel apparatus of the above described type having a vertically reciprocable control rod and pneumatic means connected with the control rod which selectively functions to balance the weight of the control rod and elements connected therewith and to actuate the control rod so as to obtain relatively short stroke operation of the machining or honing tool.

Other objects and advantages of the present invention will become apparent from the following description and the accompanying drawings wherein:

FIG. 1 is a side elevational view showing a honing apparatus incorporating the features of the present invention;

FIG. 2 is an enlarged fragmentary perspective view showing a portion of the control means for the honing apparatus incorporating the features of the present invention; and FIG. 3 is a diagrammatic view showing a portion of the honing machine control means incorporating the present invention.

Referring now more specifically to the drawings wherein like parts are designated by the same numerals throughout the various figures, an apparatus 10 incorporating the features of the present invention is shown in FIG. 1 and includes an upstanding main frame 12 and a head 14 carrying a depending honing spindle or tool 16 and mounted for vertical reciprocable movement on ways 18 secured to the frame. A hydraulic cylinder 20 is mounted on the upper end of the main frame and a piston rod 22 extends from the cylinder and is connected to the head 14 for reciprocating the head.

The apparatus is provided with means for controlling the various functions thereof including the reciprocable movement of the head 14. Reference is hereby made to the above mentioned co-pending application for a more complete disclosure of the apparatus and the electrical, hydraulic and pneumatic control means thereof. For the present case, it suffices to state that the control means comprises a control rod 24 mounted within the main frame for vertical and also rotational movement, which control rod carries at least two vertically spaced dogs 26 and 28 adapted to be engaged by a finger 30 fixed to and extending from the head 14. As shown in FIG. 2, a rotatable pilot valve 32 is disposed adjacent the lower end of the control rod, which pilot valve is adapted to control another valve not shown herein but fully disclosed in the above mentioned co-pending application for selectively directing hydraulic fluid under pressure to opposite ends of the cylinder 20 to either raise or lower the head 14. A rotatable stem 34 of the pilot valve is connected by a lever 36 and a link 38 to one end of a lever 40 which has its opposite end pivotally connected to a fixed member 42 through which the control rod slidably extends. A cam member 44 is mounted on the control rod for up and down movement therewith but is held against rotation with the rod. The cam member 44 is provided with a cam slot 46 which receives a cam follower roller 48 mounted on an intermediate portion of the lever 40 so that upon movement of the cam member with the control rod the pilot valve stem 34 is oscillated. The structure is such that when the control rod is moved downwardly by engagement of the finger 30 with the lower dog 28 as the head 14 approaches the lower limit of its reciprocable movement, the valve stem 34 is turned so that hydraulic fluid under pressure will be directed to the lower or rod end of the cylinder 20 to cause upward movement of the head. Similarly, when the control rod is moved upwardly by engagement of the finger 30 with the upper dog 26 as the head approaches the upper limit of its reciprocable movement, the valve stem 34 is reversely turned so as to direct the hydraulic fluid under pressure to the upper or head end of the cylinder 20 to cause the head to move downwardly. The weight of the control rod and elements thereon is balanced in the manner described below so that the control rod will remain in any position to which it is shifted by the finger 30 and as a result the length of the stroke of the normal reciprocable movement of the head 14 is determined by the spacing of the dogs 26 and 28.

In accordance with the present invention, a pneumatic cylinder 50 is supported on a fixed bracket 52 above the upper end of the control rod 24 in which cylinder a piston 54 is disposed. The piston 54 is connected to the upper end of the control rod by a piston rod 56 and a rotary coupling 58 so that the piston and the control rod will move vertically as a unit, but the piston will not rotate with the control rod. It is important to note that in accordance with the present invention the air cylinder 50 and piston therein serve to balance the control rod assembly during normal operation of the apparatus so that the control rod assembly will remain in any position to which it is shifted by the finger 30 and the air cylinder may also be operated so as to actuate the control rod assembly in a manner which will cause relatively short stroke reciprocable movement of the head 14. In order to accomplish these results, the apparatus is provided in addition to the pneumatic and electrical control means disclosed in the above mentioned co-pending application, the means shown in FIG. 3. More specifically, an air line 60 extends from a source 62 of air under pressure and is connected to ports of spring loaded solenoid actuated two position valves 64 and 66 by branch lines 68 and 70 respectively. Another branch line 72 extends from the line 60 to a pressure reducing valve 74 which has an outlet connected with another port of the valve 64 by a line 76. The valve 64 has an outlet port connected with the lower or rod end of the cylinder 50 by a line 78. The valve 66 has a port connected with the upper or head end of the air cylinder by a line 80 and another port 82 which is open to the atmosphere. The valves are spring loaded so that the rod end of the cylinder is normally connected to the pressure reducing valve through lines 76 and 78 and the head end of the cylinder is normally connected with the vent port 82 and the power branch lines 68 and 70 are normally blocked. In addition, the pressure reducing valve 74 is adjusted so that the pressure of the air passing therefrom to the rod end of the cylinder 50 is such as to produce an upward thrust on the lower face of the piston 54 which is equal to the combined weights of the control rod assembly, the piston and the piston rod whereby the control rod assembly will remain in any position to which it is shifted by the finger 30.

Shiftable stems of the valves 64 and 66 are respectively connected with solenoids 84 and 86 which may be selectively energized for shifting the valves to connect the rod and head ends of the cylinder 50 with a branch power line 68 and 70 and to block the reduced pressure line 76 and the vent port 82. The solenoids are respectively connected by wires 88 and 90 to push button switches 92 and 94 or the like on a control panel 96 which is conveniently located to facilitate manual operation of the solenoids.

The air cylinder 50 may be operated so as to obtain short stroke actuation of the head 14 adjacent the lower end of its normal reciprocable movement in the following manner. Assuming the head to be moving downwardly, it will continue to move downwardly until the finger 30 engages the dog 28 and shifts the control rod downwardly sufficiently to actuate the pilot valve 32 to reverse the head. Then the head starts upwardly and normally would continue such upward movement until the finger 30 engages the upper dog 26. However, an operator can reverse the upper movement of the head at any time by closing the switch 92 so as to energize the solenoid 84 and thereby shift the valve 64 to connect the power line 68 with the lower or rod end of the cylinder 50. When this is accomplished the increased air pressure within the lower end of the cylinder overcomes the weight of the piston and control rod assembly and causes the control rod assembly to be shifted upwardly so as to turn the pilot valve 32 in a manner which causes the head 14 to start moving downwardly. The length of the stroke of the head may be held to a minimum by continuously energizing the solenoid 84 so that the control rod will start to rise immediately upon the start of upward movement of the finger 30 and the head. Short stroke operation of the head adjacent the upper limit of its reciprocable movement is accomplished in the same manner by the operator closing the switch 94 so as to energize the solenoid 86 to connect the upper or head end of the air cylinder with the power line 70. Thus, when the control rod has been lifted by engagement of the finger 30 with the upper dog 26 so as to start the head 14 downwardly, closing of the switch 94 will result in air under pressure being admitted to the upper end of the cylinder 50 so as to shift the control rod downwardly and reverse the head.

While the preferred embodiment of the present invention has been shown and described herein, it is obvious that many structural details may be changed without departing from the spirit and scope of the appended claims.

The invention is claimed as follows:

1. In a workpiece machining apparatus having tool means which has a normal reciprocating movement of predetermined length during a workpiece machining operation, power means connected to the tool means for reciprocating the latter, control means for controlling operation of said power means and movement of the tool means including a vertically shiftable member successively shiftable upwardly and downwardly in response to successive movements of the tool means toward and substantially at opposite ends of the normal movement of the tool means for causing reversing of the tool means, means mounting said shiftable member for shifting movement in response to successive movements of the tool means and for movement upwardly and downwardly in a range shorter than said shifting movement imparted thereto in response to successive movements of the tool means, and selectively operable means including a source of pressure fluid, a fluid pressure cylinder connected to said source through valve means, and a piston reciprocable in said cylinder and connected to said shiftable member for selectively maintaining said shiftable member in any position to which it is moved in response to movement of the tool means, said valve means being operable to control the flow of pressure fluid to said cylinder for moving said piston to shift said member in said shorter range and to cause the tool means, when moving in one direction, to be reversed, prior to the arrival of the tool means substantially at the end of its normal movement in said one direction.

2. In a workpiece machining apparatus having tool means which has normal reciprocating movement of predetermined length in opposite directions during a workpiece machining operation, power means connected to the tool means for moving the latter, control means for controlling operation of said power means and movement of the tool means including a substantially vertically shiftable member successively shiftable upwardly and downwardly in response to successive movements of the tool means toward and substantially at opposite ends of the normal movement of the tool means for causing reversing of the tool means, means mounting said shiftable member for shifting movement in response to successive movements of the tool means and for movement upwardly and downwardly in a range shorter than said shifting movement imparted thereto in response to successive movements of the tool means, pneumatic means including a source of air under pressure, an air cylinder connected to said source through valve means, and a piston reciprocable in said cylinder and connected to said shiftable member normally for maintaining said shiftable member in any position to which it is moved in response to movement of the tool means, and means connected to operate said valve means and being operable for selectively operating said valve means to control the flow of air under pressure to said cylinder to shift said member in said shorter range and to cause the tool means, when moving in one direction, to be reversed, prior to the arrival of the tool means substantially at the end of its normal movement in said one direction.

3. The combination claimed in claim 2, wherein said means connected to operate said valve means comprises solenoid means and manually operable switches connected to said solenoid means.

References Cited in the file of this patent

UNITED STATES PATENTS

| | | |
|---|---|---|
| 2,106,216 | Johnson | Jan. 25, 1938 |
| 2,270,590 | Johnson | Jan. 20, 1942 |
| 2,356,223 | Crompton | Aug. 22, 1944 |
| 2,396,370 | Hartnett | Mar. 12, 1946 |